May 8, 1962 J. F. BRUNDAGE 3,033,295
DISK HARROW
Filed June 1, 1960 2 Sheets-Sheet 1

Inventor
John F. Brundage
By Howard B. Scheckman
Attorney

May 8, 1962  J. F. BRUNDAGE  3,033,295
DISK HARROW
Filed June 1, 1960  2 Sheets-Sheet 2
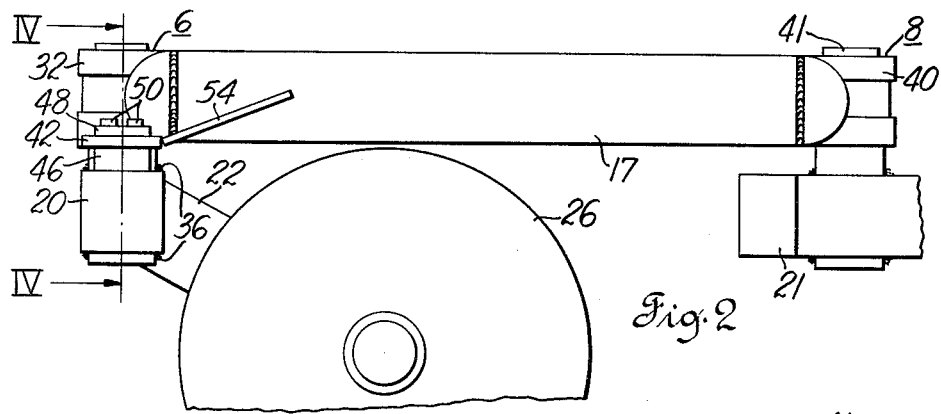
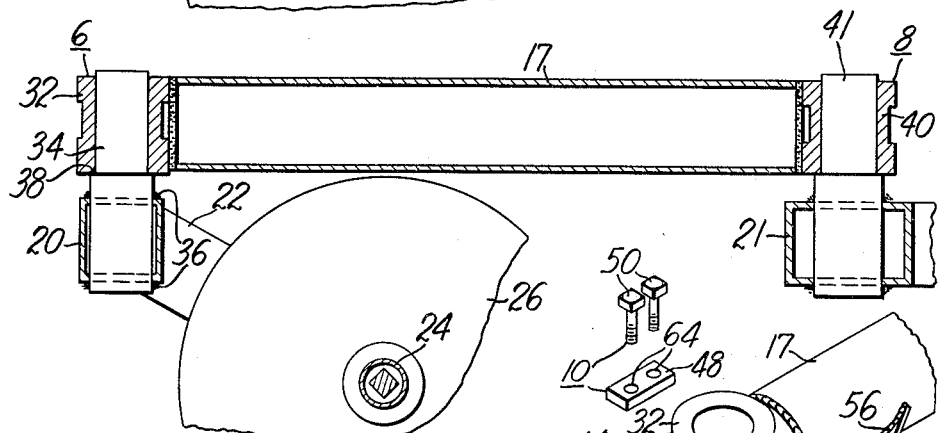
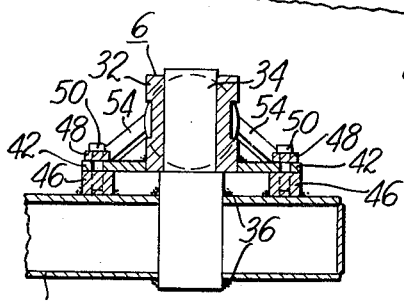
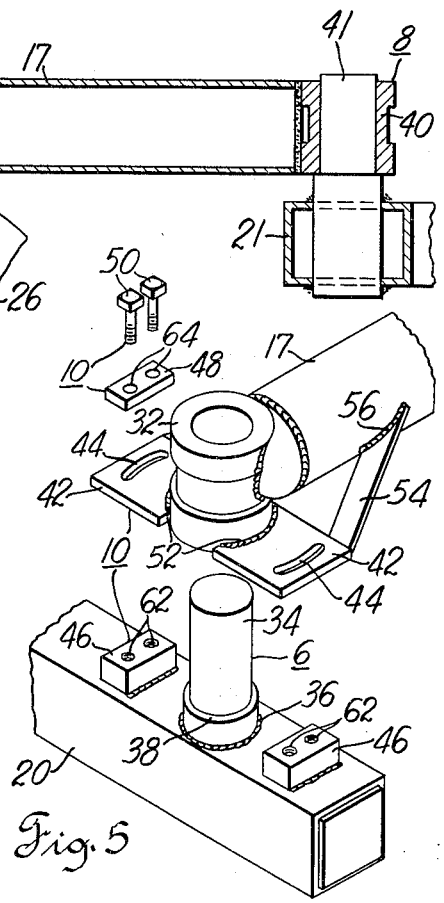
Inventor
John F. Brundage
By Howard B. Scheckman
Attorney

United States Patent Office 3,033,295
Patented May 8, 1962

3,033,295
DISK HARROW
John F. Brundage, Camarillo, Calif., assignor to Allis-Chalmers Manufacturing Company, Milwaukee, Wis.
Filed June 1, 1960, Ser. No. 33,306
6 Claims. (Cl. 172—597)

This invention relates to argricultural implements and more particularly to disk harrows of the offset type.

The front and rear gangs of offset disk harrows are made so that they can be offset with respect to each other.

The conventional way of providing offset adjustment has been through the use of a slot and bolt connection. See for example U.S. Patent 1,948,919 to Johnson.

Using a slot and bolt connection however, has certain disadvantages. As soon as the bolts are loosened the two gangs tend to sag or get out of line in a horizontal plane. This tends to bind the bolts against free movement in the slots. Also, movement of the gang in a direction parallel to the slots, tends to move or turn the bolts causing the bolts to bind in the slots. This also prevents free movement of the gangs. And, offset adjustment is limited by the length of the slot.

Another problem is that it is difficult to obtain fine offset adjustment of one gang relative to the other gang. Normally, offset adjustment is obtained by jerking the harrow around with the tractor and, it is difficult to get the desired amount of fine adjustment.

It is an object of this invention to provide a construction for a harrow that makes it easy to offset the gangs of a harrow.

It is an object of this invention to provide a harrow whose range of offset adjustment can be made much greater than prior art types.

It is another object of this invention to provide a construction for a harrow that permits use of the disk harrows hydraulic ram to provide fine offset adjustment of the gangs.

Other objects and advantages will appear from the following description considered in conjunction with the attached drawings, in which:

FIG. 2 is a side view of FIG. 1 taken in the direction of arrows II—II showing the front and rear pivot connections;

FIG. 3 is a sectional view of FIG. 1 taken in the direction of arrows III—III showing the pivot posts of the front and rear pivot connections;

FIG. 4 is a sectional view of FIG. 2 taken in the direction of arrows IV—IV showing the front pivot post of the front pivot connection, and the arm that is fastened to the frame of the front gang, and;

FIG. 5 is an exploded view showing the individual parts of the front pivot connection.

INVENTION BROADLY

Figure 1:
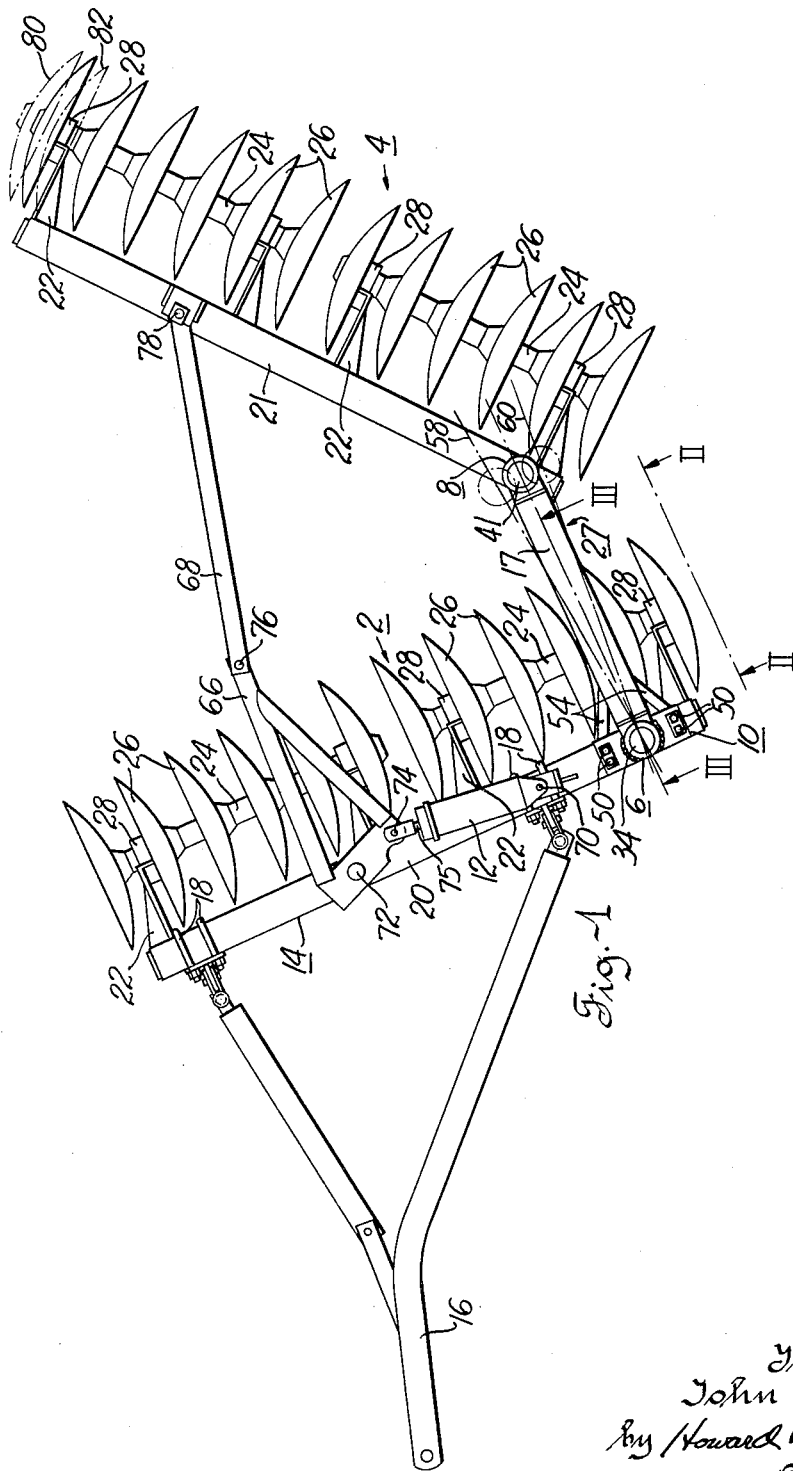
FIG. 1 is a plan view of a harrow, showing its range, of offset adjustment in dot and dash lines.

This invention broadly contemplates (FIG. 1) providing front gang 2 and rear gang 4 with a front pivotal connection 6 and a rear pivotal connection 8 between the front and rear gangs.

Control means 10 (FIG. 5) are provided to releasably fix front pivotal connection 6 against relative movement. A hydraulic ram 12 provides relative movement of the gangs.

Offset adjustment is obtained by releasing control means 10 to free front pivotal connection 6 for movement. One gang is then rotated relative to the other gang about the front pivotal connection to the desired position, and then control means 10 is operated to fix the connection.

Rear pivotal connection 8 is used to vary the working angle or angular adjustment between the two gangs during working operation. One gang is rotated relative to the other gang about rear pivotal connection 8 (the front pivotal connection being fixed).

Front pivotal connection 6 allows only true relative circular rotation of the rear gang in a horizontal plane during offset adjustment. It prevents any tipping of gangs 2 and 4 relative to each other in a vertical plane, and prevents any binding. Front pivotal connection 6 can also be lubricated to provide a connection that can be easily moved.

Hydraulic ram 12 provides angular adjustment, and can also be used to provide offset adjustment since the parts turn easily and there is not any binding of the parts.

INVENTION SPECIFICALLY

Referring to FIG. 1 there is disclosed a harrow 14 of the offset type. The harrow is made up of a front gang 2 that carries a hitch member 16, a rear gang 4, an arm 17, means 6 connecting said arm 17 to gang 2 for relative pivotal angular movement, means 8 connecting said arm 17 to gang 4 for relative pivotal offset movement, and, force means 12 interconnecting gangs 2 and 4 to move one gang relative to the other gang.

Hitch

Hitch 16 is connected to front gang 2 by means in the form of U-bolts 18. The hitch is adapted to be connected to a tractor (not shown).

Gangs

Front gang 2 includes frame 20, and rear gang 4 includes frame 21.

Each frame supports braces 22, a pair of shafts 24, and disk blades 26.

Each frame has a square cross section. Fixed to each frame, and extending rearwardly and downwardly therefrom, are two sets of braces 22. Each brace carries a bearing 28 to rotatably support harrow shaft 24. Rotatably supported by each shaft are a plurality of disk blades 26.

It is noted that, while two sets of braces are shown for each frame, the exact number of braces and shafts would be a matter of design depending on the size and job of the harrow.

Hinge Means

Hinge means 27 connects said gangs for relative pivotal angular movement and for relative pivotal offset movement. The hinge means comprises means in the form of a tubular arm 17 and individual means 6 and 8 to pivotally connect the front end of arm 17 to the front gang, and the rear end of said arm to the rear gang.

Means 6 comprises a bearing sleeve 32 fixed to arm 17 and pivot post 34 carried by front frame 20.

Pivot post 34 is connected by means such as welds 36 in one end of front frame 20. The pivot post extends vertically above said frame. It is provided with shoulder 38 to rotatably support bearing sleeve 32.

Means 8 is similar to means 6 that connects the arm to the front gang. It comprises a bearing sleeve 40 fixed to arm 17 and a pivot post 41 welded to rear frame 21.

Means to Releasably Fix Arm Relative to Front Gang

Releasable means 10 interconnects said arm and front gang and fixes them against relative pivotal movement. The means comprises a pair of plate members 42 containing slots 44, a pair of threaded block members 46, a pair of spacer members 48 and means in the form of two pair of cap screws 50 to releasably clamp said members together.

Plate members 42 are connected to sleeve 32 by welds 52 and to arm 17 by braces 54 and welds 56. The plate members extending outwardly from sleeve 32 in opposite directions. Each plate member is provided with an arcuate slot 44 that is concentric to pivot post 34. The slots are of a length to provide a sufficient range of offset movement of arm 17. This range of movement is shown by dot and dash lines 58, 60 in FIG. 1. The plate members are sandwiched between block members 46 and spacer members 48.

Fixed to front frame 20 at opposite sides of pivot post 34 are block members 46, 46 containing threaded openings 62. When bearing sleeve 32 is assembled on pivot post 34, the undersurface of plate members 42, 42 rest on block members 46, 46. And slots 44, 44 in the plate members will align with threaded openings 62 in said block members.

Spacer members 48 engage the upper surface of plate members 42 to provide a large surface area to distribute the force of cap screws 50. And, they prevent the heads of the cap screws from deforming the plate member through direct contact. Cap screws 50 are inserted through openings 64 in the spacer members, slots 44, and are threaded into openings 62 in block members 46.

When cap screws 50 are loosened, arm 17 may be rotated very easily and there is no binding of the cap screws in slots 44 as offset adjustment is made; it being noted that cap screws 50 do not move with arm 17. Bearing sleeve 32 may also be provided with a lubricant fitting, so the pivot post can be lubricated to provide smooth movement.

The lengths of slots 44 in the plate members are selected to provide the desired range of relative lateral or offset adjustment of the rear frame. Since the end of arm 17 connected to rear gang 4 rotates about front pivot post 34 it will move through an arc that is greater than the length of the slot. This is like the end of a seesaw moving through a larger arc than the center of the seesaw. With this construction it is possible to obtain a range of offset adjustment that is greater than the size of the slots.

*Force Means*

Force means are provided to move one gang angularly relative to the other gang. It comprises hydraulic ram 12, bell crank or triangular shaped member 66, and link 68.

The base of hydraulic ram 12 is pivotally connected to the front frame by pivot 70. Bell crank 66 is rotatably connected to front frame 20 by shaft 72. One arm of bell crank 66 is connected by pivot 74 to piston rod 75 of the hydraulic ram. The other arm of the bell crank is connected by pivot 76 to link 68 in turn connected by pivot 78 to rear frame 21. Conventional controls (not shown) are provided to operate the hydraulic ram.

OPERATION

To vary the working angle or obtain relative angular adjustment, the hydraulic ram is actuated to rotate bell crank 66. Link 68 in turn will move rear gang 4 about pivot post 41 relative to front gang 2 to the position desired.

To obtain offset adjustment, cap screws 50 are loosened and the gangs are relatively moved by the hydraulic ram, either toward their closed position (gangs parallel) or their open position (FIG. 1)—depending on whether it is desired to move the disks toward the position indicated by dot and dash lines 80 or 82. This movement causes arm 17 to rotate about pivot post 34 relative to front frame 20. When the desired amount of offset is obtained, cap screws 50 are retightened to fix arm 17 in its new position.

SUMMARY

This invention provides a simple construction for offsetting one gang with respect to the other gang. One gang cannot sag or get out of line with respect to the other gang and cannot cause binding. Since the pivot members can be lubricated, the offset movement will be smooth and effortless. The gangs will be under control at all times. And, the adjustment can be simply and accurately performed by using the hydraulic ram on the harrow.

Although but a single embodiment of the present invention has been illustrated and described, it will be apparent to one skilled in the art that various changes and modifications may be made therein without departing from the invention or from the scope of the appended claims.

What is claimed is:

1. In an offset disk harrow: a first disk gang; a second disk gang; an arm; means connecting said arm to said first disk gang for relative pivotal movement, means connecting said arm to said second disk gang for relative pivotal movement; control means to releasably fix said arm relative to one of said gangs while permitting said other gang to pivot relative to said arm; and, force means interconnecting said gangs to rotate one gang relative to the other gang.

2. In an offset disk harrow, the combination comprising: a first disk gang; a second disk gang; an arm; first means pivotally connecting said arm to said first gang; second means pivotally connecting said arm to said second gang; control means carried by said first gang and cooperating with said first means to fix said first means against pivotal movement relative to said first gang while permitting said second gang to pivot relative to said arm, said control means being releasable to permit relative movement between said first means and said arm to provide offset adjustment; and, force means interconnecting said gangs to rotate one gang relative to said other gang.

3. In an offset disk harrow, the combination comprising: a first disk gang; a second disk gang; an arm; first means pivotally connecting said ram to said first gang; second means pivotally connecting said arm to said second gang; a plate member carried by said arm; a block member carried by said gang; means to clamp said members together to prevent relative pivotal movement between said block member and said plate member, said means being releasable to permit offset adjustment; and, force means interconnecting said gangs to rotate one gang relative to said other gang.

4. In an offset disk harrow, the combination comprising: a first disk gang; a second disk gang; an arm; a bearing sleeve carried by each end of said arm; a vertical pivot post carried by said first gang; a vertical pivot post carried by said second gang; said pivot posts rotatably receiving said bearing sleeves; control means carried by said first gang and cooperating with said bearing sleeve to fix said arm against pivotal movement relative to said first gang, said control means being releasable to permit offset adjustment; and, force means interconnecting said gangs to rotate one gang relative to said other gang.

5. In an offset disk harrow, the combination comprising: a first disk gang; a second disk gang; an arm having a bearing sleeve fixed to each end; a vertically extending first pivot post carried by said first disk gang and rotatably supporting one of said bearing sleeves; a vertically extending second pivot post carried by second disk gang and rotatably supporting the other of said bearing sleeves; a plate member carried by the bearing sleeve supported by said first pivot post; said plate member containing a slot; a block member carried by said first gang and engaging the undersurface of said plate member, said block member containing a threaded opening aligned with said slot; a spacer member containing an opening, said spacer member engaging the upper surface of said plate member; a bolt extending through said spacer member, said slot and said threaded opening in said block; said bolt when tightened, clamping said spacer member against said plate and said plate against said disk gang to prevent said arm from moving relative to said first gang, said bolt being releasable to permit offset adjustment; and, force means interconnecting said gangs to rotate one gang relative to said other gang.

6. A device as set forth in claim 5 wherein said slot in said plate member is arcuate and concentric to said first pivot post.

References Cited in the file of this patent

UNITED STATES PATENTS

| | | |
|---|---|---|
| 977,099 | King | Nov. 29, 1910 |
| 2,568,082 | McKay | Sept. 18, 1951 |
| 2,860,471 | Welch | Nov. 18, 1958 |
| 2,944,614 | Shipp | July 12, 1960 |

UNITED STATES PATENT OFFICE
CERTIFICATE OF CORRECTION

May 8, 1962

Patent No. 3,033,295

John F. Brundage

It is hereby certified that error appears in the above numbered patent requiring correction and that the said Letters Patent should read as corrected below.

Column 4, line 36, for "ram" read -- arm --.

Signed and sealed this 28th day of August 1962.

(SEAL)
Attest:

ESTON G. JOHNSON
Attesting Officer

DAVID L. LADD
Commissioner of Patents